United States Patent [19]

Emura

[11] Patent Number: 5,424,864
[45] Date of Patent: Jun. 13, 1995

[54] MICROCELLULAR MOBILE COMMUNICATION SYSTEM

[75] Inventor: Katsumi Emura, Tokyo, Japan

[73] Assignee: NEC Corporation, Tokyo, Japan

[21] Appl. No.: 284,276

[22] Filed: Aug. 2, 1994

Related U.S. Application Data

[63] Continuation of Ser. No. 959,558, Oct. 13, 1992, abandoned.

[30] Foreign Application Priority Data

Oct. 24, 1991 [JP] Japan .................... 3-277649

[51] Int. Cl.6 ............... H04B 10/00; H04B 10/12
[52] U.S. Cl. .................... 359/173; 359/124; 359/172; 359/152
[58] Field of Search .......... 359/123, 124, 125, 145, 359/172, 173, 152; 370/69.1, 71, 95, 95.3; 455/56.1, 53.1; 348/6, 10–13

[56] References Cited

U.S. PATENT DOCUMENTS

| | | | |
|---|---|---|---|
| 4,392,242 | 7/1983 | Kai | 455/56.1 |
| 4,807,222 | 2/1989 | Amitay | 359/152 |
| 4,916,460 | 4/1990 | Powell | 359/152 |
| 5,060,310 | 10/1991 | Frisch et al. | 359/124 |
| 5,067,173 | 11/1991 | Gordon et al. | 359/152 |
| 5,159,479 | 10/1992 | Takagi | 359/152 |
| 5,202,780 | 4/1993 | Fussganger | 359/125 |
| 5,251,053 | 10/1993 | Heidemann | 359/145 |

FOREIGN PATENT DOCUMENTS

| | | | |
|---|---|---|---|
| 0389062 | 9/1990 | European Pat. Off. | H04J 14/02 |
| 5143854 | 10/1980 | Japan | H04B 9/00 |
| 0009240 | 1/1990 | Japan | 359/145 |
| 29240 | 1/1990 | Japan | H04B 10/20 |

OTHER PUBLICATIONS

41st IEEE Vehicular Technology Conference, St. Louis, 19 May 1991, pp. 921–924, R. P. Merrett et al., "A Cordless Access System Using Radio–Over–Fibre Techniques".
Fig. 11.14 on p. 252 of "Automobile Telephone".
M. Shibutani et al, "Optical Fiber Transmission of RF Signal for Microcellular Mobile Communication Systems", Sep. 19, 1990, pp. 19–26.
Chu et al, Fiber Optic microcellular radio 1991, All.

*Primary Examiner*—David K. Moore
*Assistant Examiner*—Rafael Bacares
*Attorney, Agent, or Firm*—Sughrue, Mion, Zinn, Macpeak & Seas

[57] ABSTRACT

A microcellular mobile radio communication system has a central base station and a plurality of radio base stations interconnected by a shared optical fiber transmission line. In the central and radio base stations, electrical radio signals are frequency-converted to frequencies assigned to the radio base stations and then converted into optical signals. In the central base station, the optical signals are combined for transmission through the optical fiber transmission line to the radio base stations. Alternatively, the frequency-converted electrical radio signals may first be combined and then converted into an optical signal for transmission. In the radio base stations, the electrical radio signals are converted to optical signals, which are combined and transmitted through the transmission line to the central radio station. In each radio base station, the frequency of the radio signal extracted from the received combined signal is frequency-converted to a frequency to be transmitted from its antenna, with the other signals filtered out. The central base station demodulates the received combined signal from the radio base stations into signals for the exchange office. The radio signals in different frequency bands assigned to each radio base station can simultaneously be transmitted through the shared optical fiber transmission lines between the radio and central base stations.

5 Claims, 2 Drawing Sheets

MICROCELLULAR MOBILE COMMUNICATION SYSTEM

This is a Continuation of Application Ser. No. 07/959,558 filed Oct. 13, 1992 now abandoned.

BACKGROUND OF THE INVENTION

1. Field of the Invention

The present invention relates to a microcellular mobile radio communication system.

2. Description of the Prior Art

A mobile communication system such as, for example, an automobile telephone system has radio base stations which are composed of an antenna, an antenna duplexer, transmitter and receiver devices for communication and control, a base station controller and other device, as shown in FIG. 11.14 on page 252, of AUTOMOBILE TELEPHONE edited by Moriji Kuwabara and published by the Institute of Electronics, Information and Communication Engineers.

An automobile telephone system has its service area divided into a plurality of small zones or regions called microcells each having its own radio base station. A plurality of radio base stations in noncontiguous microcells can reuse the same radio frequencies without undue interference therebetween, for effective utilization of limited frequency resources. Such an automobile telephone system is referred to as a microcellular mobile radio communication system. In microcellular mobile radio communication systems, it may become necessary for the radio base stations to be positioned in scattered locations, sometimes on street lampposts and utility poles, for example.

Current radio base stations which include transmitter and receiver devices and a base station controller, among others, as described above, cannot satisfy the requirements for small size and high reliability which must be met when installed on street lampposts and utility poles. One proposed solution is to separate the transmitter and receiver devices and the base station controller from the antenna section in each radio base station, and to locate the transmitter and receiver devices and the base station controllers in a central base station, and the antenna sections in the radio base stations with the transmitter and receiver devices and the base station controllers being connected to the antenna sections through optical fibers (see, for example, OPTICAL FIBER TRANSMISSION OF RF SIGNAL FOR MICROCELLULAR MOBILE COMMUNICATION SYSTEMS, SAT90-32, RCS90-12, by Shibutani et al., Radio Communication System Research Group, the Institute of Electronics, Information and Communication Engineers). According to the proposed system, since radio signals are transmitted through optical fibers from the central base station to the radio base stations, the radio base stations in each cell can be reduced in size and cost, making it possible to realize a microcellular mobile communication system based on microcells. However, a microcellular mobile communication system employing optical fiber feeders normally requires that the central base station and each of the radio base stations be connected to each other by optical fibers. Therefore, as the microcells decrease in size and increase in number, the number of optical fibers required becomes so enormous that sufficient optical fibers may not be available depending on the conditions in which optical fiber cables are actually installed.

SUMMARY OF THE INVENTION

It is an object of the present invention to provide a microcellular mobile radio communication system which has a central base station and a plurality of radio base stations, employing a single optical fiber for transmitting radio signals from the central base station to some of the radio base stations to solve the problem of insufficient optical fibers, and which permits effective utilization of optical fiber transmission lines even when the central base station is required to be connected to a very large number of radio base stations due to an increase in the number of microcells. This system is also very economic and well adapted to a large service area.

According to the present invention, there is provided a microcellular mobile radio communication system for radio communications with a mobile unit, comprising: a plurality of radio base stations adapted to be allocated to each microcell, each of the radio base stations comprising an antenna for transmitting a radio signal to and receiving a radio signal from a mobile unit, first frequency converting means for converting the frequency of the radio signal received by the antenna to a predetermined frequency assigned to its own radio base station, electrical-to-optical transducer means for converting the frequency-converted radio signal to an optical signal, and for transmitting the optical signal as an upstream optical signal, optical-to-electrical converter means for converting downstream optical signals of different frequency signals into electrical signals, and second frequency converting means for converting the frequency of one of the electrical signals which is destined for its own radio base station to a frequency assigned to the mobile unit, and for transmitting the frequency-converted signal to the antenna; a central base station comprising optical-to-electrical converter means for converting the upstream optical signals from the electrical-to-optical converter means of the radio base stations into electrical signals, demodulating means for demodulating said electrical signals into signals to be transmitted to an exchange office, frequency converting means for frequency-converting signals from the exchange office to separate electrical signals having frequencies assigned to each radio base station, and electrical-to-optical transducer means for converting the frequency-converted electrical signals to separate optical signals, and for transmitting said optical signals as the downstream optical signals to the optical-to-electrical converter means of the radio base stations; and optical fiber transmission means connected between and shared by the radio base stations and the central base station, for transmitting the upstream optical signals of each different frequency assigned separately to the radio base stations from the radio base stations to the central base station, and for transmitting the downstream optical signals of each different frequency assigned separately to the radio base stations from the central base station to the radio base stations.

Generally, only limited frequency bands are available in a mobile communication service. For example, only about 20 MHz bandwidth in the 800 MHz band is allotted to analog automobile telephone systems currently in use. In a microcellular mobile radio communication system, frequencies are assigned to separate small zones or microcells so that the same frequency is reused in noncontiguous microcells with no interference therebetween, and further very close frequencies are used in microcells that are positioned closely to each other. The central base station and the radio base stations of the microcellular mobile radio communication system are interconnected by optical fiber transmission lines for transmission of radio signals therebetween. If the central base station and the radio base stations were interconnected by separate optical fibers, then no problem will arise irrespective of which frequencies are used to transmit radio signals to and from the radio base stations. On the other hand, if a single optical fiber is used to transmit radio signals to a plurality of radio base stations for efficient utilization of optical fibers, then it is necessary for each radio base station to extract the radio signal destined for itself from the frequency-multiplexed signal transmitted through the optical fiber. Since, however, the differences between the frequencies assigned to the microcells are small, it is impossible to separate radio signals destined for different radio base stations even with an electric filter.

With the arrangement of the present invention, although radio signals transmitted from and received by the antennas of the radio base stations are in the 800 MHz band, optical signals are transmitted in different frequencies assigned to the microcells through optical fibers. For example, when downstream radio signals are to be transmitted from the central base station to the radio base stations, the frequency converting means, i.e., frequency converters of the central base station, frequency-convert the signals to frequencies assigned to each of the radio base stations. Inasmuch as the frequency converters may be in the form of local oscillators for each radio base station, the central base station may be relatively small in scale. Consequently, the optical signals are transmitted in separate frequencies different from each other through an optical fiber which is shared by the radio base stations for which the signals are destined. In each of the radio base stations, the radio signal destined for itself is frequency-converted into the 800 MHz band with an 800 MHz-bandpass filter, which effectively cuts off the signals destined for the other radio base stations. Therefore, the antenna of each radio base station can transmit only the radio signal destined for itself. Similarly, upstream radio signals from the radio base stations can be transmitted in separate frequencies through an optical fiber to the central base station.

Although the signals destined for each microcell are simultaneously received by each of the radio base stations, since the signals are transmitted in different frequencies assigned to each microcell through an optical fiber, the received signals are not subject to any substantial distortion due to the interaction of the carriers.

The above and other objects, features and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Now, a preferred embodiment of the invention will be explained in detail referring to FIGS. 1 and 2.

Figure 1:
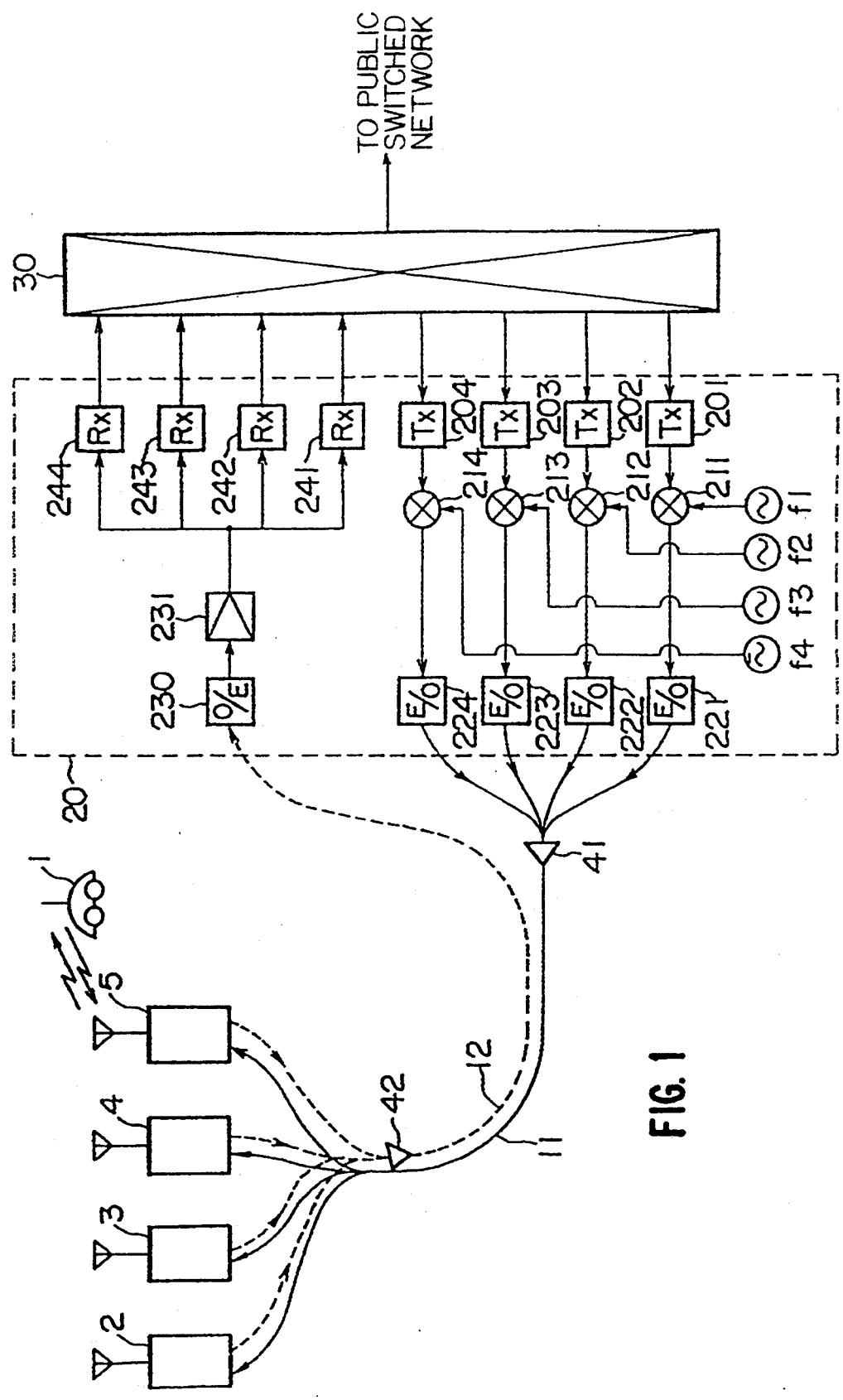
FIG. 1 is a block diagram of the microcellular mobile radio communication system according to the present invention.
Figure 2:
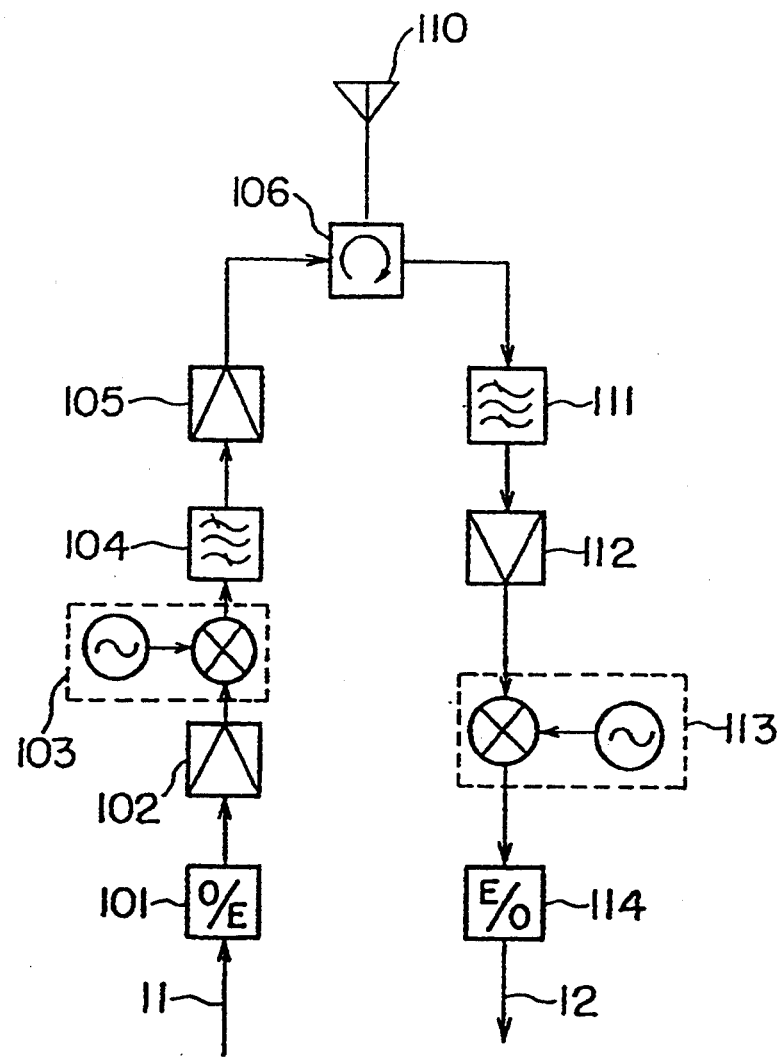
FIG. 2 is a block diagram of one radio base station of the microcellular mobile radio communication system shown in FIG. 1.

As shown in FIG. 1, the microcellular mobile radio communication system comprises mobile unit 1, a plurality of radio base stations 2 through 5, optical fiber transmission lines 11, 12, central base station 20, and exchange office 30. Mobile unit 1 and exchange office 30 are of a general structure known to those skilled in the art, and hence will not be described in detail below.

Central base station 20 has a plurality of transmitters 201, 202, 203, 204 for converting a downstream signal from exchange office 30 into separate signals each in the 800 MHz band for small zones or microcells to which radio base stations 2, 3, 4, 5, respectively, belong, a plurality of frequency converters 211, 212, 213, 214 for converting the frequencies of output signals from transmitters 201 to 204 to frequencies using predetermined different frequencies f1, f2, f3, f4, respectively, assigned to the microcells, and a plurality of electrical-to-optical converters 221, 222, 223, 224 for converting frequency-converted signals from frequency converters 211 to 214 to optical signals. Central base station 20 also has an optical-to-electrical converter 230 for converting upstream optical signals from radio base stations 2 to 5 into electrical signals, common amplifier 231 for amplifying the output electrical signals from optical-to-electrical converter 230, and a plurality of demodulators 241, 242, 243, 244 for demodulating amplified output signals from common amplifier 231 into signals, belonging to each microcell, which are to be transmitted to exchange office 30.

Radio base stations 2 to 5 are of an identical structure. As shown in FIG. 2, each of radio base stations 2 to 5 comprises optical-to-electrical converter 101 composed of a photodiode and a front end circuit for converting downstream optical signals from central base station 20 into electrical signals, microwave-band amplifier 102 for amplifying the output electrical signals from optical-to-electrical converter 101, frequency converter 103 for converting the frequencies of amplified signals from microwave-band amplifier 102 such that the frequency of the signal destined for its own microcell in the amplified signals will be in the 800 MHz band, 800 MHz-bandpass filter 104 for passing only the signal destined for its own microcell, transmission amplifier 105 for amplifying an output signal from 800 MHz-bandpass filter 104, antenna 110 which transmits signals to and receives signals from the mobile unit 1, transmission/reception branching filter 106 for transmitting signals to and receiving signals from antenna 110, reception filter 111 for filtering a signal received through transmission/reception branching filter 106, reception amplifier 112 for amplifying an output signal from reception filter 111, frequency converter 113 for converting the frequency in the 800 MHz band of an amplified output signal from reception amplifier 112 to a predetermined frequency, and electrical-to-optical converter 114 for converting the frequency-converted signal from frequency converter 113 to an optical signal.

Optical signal transmission lines 11, 12 are shared by radio base stations 2 to 5 for the transmission of both downstream and upstream signals between central base station 20 and radio base stations 2 to 5. Each of optical signal transmission lines 11, 12 comprises a single optical fiber cable. Optical signal transmission lines 11, 12 are associated at their transmission sides with separate optical couplers (not shown) and separate optical amplifiers 41, 42. Downstream signals are distributed to radio base stations 2 to 5 by an optical coupler (not shown) which is associated with optical signal transmission line 11 near radio base stations 2 to 5. Optical signal transmission lines 11, 12, radio base stations 2 to 5, and central base station 20 are therefore connected in a star-shaped configuration so that all signals destined for the four microcells can be transmitted to radio base stations 2 to 5.

The communication process using the microcellular mobile radio communication system shown in FIGS. 1 and 2 will be described below.

In central base station 20, downstream signals from exchange office 30 are converted to signals each in the 800 MHz band for each destination microcell by respective transmitters 201 to 204. Output signals from transmitters 201 to 204 are frequency-converted by respective frequency converters 211 to 214, respectively, using different frequencies f1 to f4, respectively, for each destination microcell. The frequency-converted signals from frequency converters 211 to 214 have bands of 200 MHz, 400 MHz, 600 MHz, and 1 GHz, respectively, for example. The frequency-converted signals are then converted to optical signals by electrical-to-optical transducers 221 to 224. The output optical signals from electrical-to-optical transducers 221 to 224 are then combined by the optical coupler into an optical signal which is then amplified by optical amplifier 41. The amplified optical signal is then transmitted through downstream optical fiber transmission line 11, and branched to the radio base stations 2 to 5 by the optical coupler. The transmitted optical signals include all the signals destined for the four microcells.

In each of radio base stations 2 to 5, the transmitted optical signals are converted back into electrical signals by optical-to-electrical converter 101. The electrical signals are amplified by micro-wave-band amplifier 102, and then frequency-converted by frequency converter 103 so that the frequency of the signal destined for its own microcell is in the 800 MHz band using one of frequencies f1 to f4 which is assigned to its own microcell. The frequency-converted signals are then applied to 800 MHz-bandpass filter 104, which passes only the frequency-converted signal destined for its own microcell. The signal that passed through 800 MHz-bandpass filter 104 is amplified by transmission amplifier 105, directed to antenna 110 by transmission/reception branching filter 106, and then transmitted from antenna 110. Although the signals destined for the other microcells are also transmitted to each of radio base stations 2 to 5 from optical fiber transmission line 11, they are substantially completely rejected by bandpass filter 104 since they have different frequency bands from the frequency band assigned to its own microcell. It has also been confirmed that any signal distortion caused in each of radio base stations 2 to 5 by the signals destined for the other microcells is negligibly small.

An upstream signal in the 800 MHz band, which has been transmitted from mobile unit 1 and received by antenna 110, is directed by transmission/reception branching filter 106 to pass through reception filter 111 and reception amplifier 112. The upstream signal is then frequency-converted by frequency converter 113. The frequency-converted signal has a predetermined frequency so that it does not overlap the frequencies of signals from the other microcells which share upstream optical fiber transmission line 12. The frequency-converted signal is then converted by electrical-to-optical converter 114 to an optical signal, which is transmitted through upstream optical fiber transmission line 12 to central base station 20. Radio base stations 2 to 5 are identical in structure, as described above, except that their frequency converters 103, 113 convert input frequencies into different frequencies.

As shown in FIG. 1, the upstream optical signals of different frequencies from radio base stations 2 to 5 are simultaneously transmitted, i.e., combined by the optical coupler and transmitted, through optical amplifier 42 over optical fiber transmission line 12 to central base station 20. In central base station 20, the upstream optical signals are converted to electrical signals by optical-to-electrical converter 230. At this time, the upstream optical signals from each of radio base stations 2 to 5 have been transmitted in the different frequency bands, as described above. The electrical signals from optical-to-electrical converter 230 are then amplified by common amplifier 231, and demodulated by demodulators 241 to 244 corresponding to the frequencies assigned to each of radio base stations 2 to 5. The demodulated signals are then transmitted from central base station 20 to exchange office 30.

In the above embodiment, optical amplifiers 41, 42 are employed to compensate for any energy loss due to the combination and branching of the optical signals. As a result, the levels of the optical signals which are applied to optical-to-electrical converters 101,230 in central base station 20 and radio base stations 2 to 5 are high enough to achieve the desired signal-to-noise ratio. Any signal deterioration owing to the signal distortion resulting from the simultaneous reception of the signals from the other microcells is reduced to 3 dB or less, so that the overall microcell mobile radio communication system can handle signals in a sufficiently wide dynamic range.

In the illustrated embodiment, downstream signals destined for the four radio base stations are transmitted through a single optical fiber transmission line. However, any desired number of downstream signals which can satisfy the required system performance can be transmitted through a single optical fiber transmission line, taking into account various factors such as the distance over which the signals are to be transmitted. While all the signals destined for the radio base stations are frequency-converted in the illustrated embodiment, one of the signals may be transmitted in the 800 MHz band as is.

In the illustrated embodiment, transmitters 201 to 204 in central base station 30 are of an existing circuit arrangement for converting the frequencies of downstream signals from exchange office 30 to those in the 800 MHz band. If existing transmitters 201 to 204 are not employed, then downstream signals from exchange office 30 may be applied directly to frequency converters 211 to 214. The frequency-converted signals from frequency converters 211 to 214 may be electrically combined into a combined electrical signal which may then be converted to an optical signal by a single electrical-to-optical converter, rather than being converted to optical signals by each of electrical-to-optical signals by each of electrical-to-optical conveters 221 to 224 as in the illustrated embodiment. In central base station 20, the upstream signals are demodulated by demodulators 241 to 244, with their frequencies being the same as those of the optical upstream signals from radio base stations 2 to 5. However, the frequencies of all the upstream signals may be converted into those in the 800 MHz band in central base station 20 to allow demodulators 241 to 244 to be of an existing circuit arrangement.

Frequency converter 103 and bandpass filter 104 may be switched around in position in each of radio base stations 2 to 5. In each of radio base stations 2 to 5, the upstream signals may be frequency-converted by frequency converter 113 without being first filtered by reception filter 111, and may then be filtered in the frequency bands converted by frequency converter 113.

Optical fiber transmission lines 11, 12 are shown as being shared by radio base stations 2 to 5 in the star-shaped configuration. However, they may be shared in a ring-shaped or bus-shaped configuration.

Although certain preferred embodiments of the present invention have been shown and described in detail, it should be understood that various changes and modifications may be made therein without departing from the scope of the appended claims.

What is claimed is:

1. A microcellular mobile radio communication systems for radio communication with a plurality of mobile units, comprising:

a) a plurality of radio base stations (2–5) adapted to be allocated to separate microcells, each of said radio base stations comprising:

an antenna (110) for transmitting a radio signal to and receiving a radio signal from a mobile unit;

first frequency converting means (113) for converting the frequency of the radio signal received by said antenna into a predetermined frequency assigned to its own radio base station;

electrical-to-optical converter means (114) for converting the frequency-converted radio signal to an optical signal, and for transmitting the optical signal as an upstream optical signal (12);

optical-to-electrical converter means for converting downstream optical signals (11) of different frequency signals to electrical signals; and second frequency converting means (103) for converting the frequency of one of said electrical signals which is destined for its own radio base station to a frequency assigned to the mobile unit, and for transmitting the frequency-converted signal to said antenna;

b) a central base station (20) comprising:

optical-to-electrical converter means (230) for converting the upstream optical signals from the electrical-to-optical converter means of said radio base stations to electrical signals;

demodulating means (241–244) for demodulating said electrical signals into signals to be transmitted to an exchange office (30);

frequency converting means (211, f1; 212, f2; 213, f3; 214, f4) corresponding to said second frequency converting means (103) of said radio base stations (2,3,4,5), respectively, for frequency-converting signals from the exchange office to separate electrical signals having frequencies assigned to each of said radio base stations, said assigned frequencies differing from each other, add each of said signals from the exchange office having the same frequency as the signal frequency-converted by said corresponding second frequency converting means (103); and electrical-to-optical converter means (221–224) for converting the frequency-converted separate electrical signals to separate optical signals, and for transmitting said optical signals as said downstream optical signals to said optical-to-electrical converter means of said radio base stations, said separate optical signals having a single carrier frequency;

c) optical fiber transmission means connected between and shared by said radio base stations and said central base station, for transmitting the upstream optical signals of different frequencies assigned to each of said radio base stations from said radio base stations to said central base station, and for transmitting the downstream optical signals of different frequencies assigned to each of said radio base stations from said central base station to said radio base stations.

2. A microcellular mobile radio communication system according to claim 1, wherein said frequencies, assigned to each of said radio base stations, of the electrical signals frequency-converted by said frequency converting means of said central base station are different from the predetermined frequencies converted by the first frequency converting means of each radio base station.

3. A microcellular mobile radio communication system according to claim 1, wherein said electrical-to-optical converting means of said central base station comprises means for individually converting the separate electrical signals from said frequency converting means to the separate optical signals and combining said separate optical signals to an optical signal for transmission as said downstream optical signals through said optical fiber transmission means.

4. A microcellular mobile radio communication system according to claim 1, wherein said electrical-to-optical converter means of said central base station comprises means for combining the separate electrical signals from said frequency converting means to a combined electrical signal and converting said combined electrical signal to an optical signal for transmission as said downstream optical signals through said optical fiber transmission means.

5. A microcellular mobile radio communication system according to claim 1, wherein said frequencies, assigned to each of said radio base stations, of the electrical signals frequency-converted by said frequency converting means of said central base station are the same as the predetermined frequencies converted by the first frequency converting means of each radio base station.

* * * * *